United States Patent
Chen et al.

(10) Patent No.: US 10,348,432 B2
(45) Date of Patent: Jul. 9, 2019

(54) NETWORK SIGNALING FOR NETWORK-ASSISTED INTERFERENCE CANCELLATION AND SUPPRESSION

(71) Applicant: Texas Instruments Incorporated, Dallas, TX (US)

(72) Inventors: Runhua Chen, Plano, TX (US); Eko N. Onggosanusi, Allen, TX (US); Ralf Matthias Bendlin, Plano, TX (US); Anthony Edet Ekpenyong, Houston, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 435 days.

(21) Appl. No.: 14/285,759

(22) Filed: May 23, 2014

(65) Prior Publication Data

US 2014/0362769 A1    Dec. 11, 2014

Related U.S. Application Data

(60) Provisional application No. 61/833,765, filed on Jun. 11, 2013.

(51) Int. Cl.
*H04J 11/00* (2006.01)

(52) U.S. Cl.
CPC ....... *H04J 11/0053* (2013.01); *H04J 11/0036* (2013.01)

(58) Field of Classification Search
CPC .......................... H04W 72/02; H04W 36/0016
(Continued)

(56) References Cited

U.S. PATENT DOCUMENTS

| 9,264,097 B2 | 2/2016 | Gorokhov et al. |
| 2011/0188458 A1 | 8/2011 | Sebeni et al. |

(Continued)

FOREIGN PATENT DOCUMENTS

| JP | 2012529785 A | 11/2012 |
| JP | 2013501416 A | 1/2013 |

(Continued)

OTHER PUBLICATIONS

ZTE, Consideration on Channels of Interest for NAICS, 3GPP TSG-RAN WG1#73, R1-132097, Fukouka, Japan, May 20-24, 2013 (5 pages).

*Primary Examiner* — Iqbal Zaidi
(74) *Attorney, Agent, or Firm* — Gregory J. Albin; Charles A. Brill; Frank D. Cimino

(57) ABSTRACT

Embodiments of the invention are directed to a cellular communication network that can determine whether communications between one base station-UE pair may interfere with another UE that is in the same cell or a different cell. The network identifies interference parameters associated with interference signals that may be received by a UE. The interference signals may be generated by the base station itself, such as communications with other UEs, or by a neighboring base station. The base station transmits the interference parameters to the UE. The UE receives the one or more parameters comprising information about signals expected to cause intra-cell or inter-cell interference. The UE then processes received signals using the one or more parameters to suppress the intra-cell or inter-cell interference.

5 Claims, 3 Drawing Sheets

(58) Field of Classification Search
USPC .................................. 370/328–339, 342–527
See application file for complete search history.

(56) References Cited

U.S. PATENT DOCUMENTS

| | | | |
|---|---|---|---|
| 2011/0280223 A1 | 11/2011 | Maeda et al. | |
| 2014/0177485 A1* | 6/2014 | Wang ........................ | H04L 1/00 |
| | | | 370/280 |
| 2014/0307569 A1* | 10/2014 | Barbieri ................ | H04L 5/0032 |
| | | | 370/252 |
| 2015/0244439 A1* | 8/2015 | Nam .................... | H04L 5/0048 |
| | | | 370/329 |
| 2016/0021565 A1 | 1/2016 | Kim et al. | |

FOREIGN PATENT DOCUMENTS

| | | |
|---|---|---|
| JP | 2016509430 A | 3/2016 |
| WO | 2009097070 | 5/2009 |
| WO | 2010087172 | 8/2010 |
| WO | 2011014709 A1 | 2/2011 |
| WO | 2011130444 | 10/2011 |
| WO | 2014157786 A1 | 2/2014 |

* cited by examiner

NETWORK SIGNALING FOR NETWORK-ASSISTED INTERFERENCE CANCELLATION AND SUPPRESSION

CROSS-REFERENCE TO RELATED APPLICATIONS

This application claims the benefit of the filing date of U.S. Provisional Patent Application No. 61/833,765, filed on Jun. 11, 2013, titled "Method and Apparatus for Network Signaling for Network-Assisted Interference Cancellation and Suppression" the disclosure of which is hereby incorporated by reference herein in its entirety.

TECHNICAL FIELD

The technical field of this invention is wireless communication such as wireless telephony.

BACKGROUND

A cellular wireless network comprises multiple base stations, where each base station transmits to (downlink) and receives from (uplink) a plurality of mobile users in its coverage area. In the downlink, each user receives data from its serving base station (or serving cell). Signals from neighboring base stations may impose inter-cell interference. Because all base stations in a particular cellular wireless network operate on the same spectrum, interference is considered to be a major bottleneck for cellular communications. This becomes more of a problem as the base station density continues to grow rapidly due to the deployment of low-power, small-form-factor base stations (i.e., small-cells). As such, mitigating co-channel interference is an increasingly important factor for continuous data rate and spectral-efficiency improvement in cellular networks.

SUMMARY

A cellular communication network is aware of which base stations are communicating with which UEs, and can determine that communications between one base station-UE pair may interfere with another UE that is in the same cell or a different cell. The network may notify a base station of communications in a neighboring cell that may cause interference. Alternatively, the base station may determine that communications to UEs within the base station's own cell may cause interference.

The base station identifies interference parameters associated with interference signals that may be received by a UE. The interference signals may be generated by the base station itself, such as communications with other UEs, or by a neighboring base station. The base station transmits the interference parameters to the UE. The one or more parameters identify a number of interference signals that may affect the user equipment. The interference parameters may be semi-statically configured, such as by RRC signaling or they may be dynamically configured by the network or base station.

The base station may include a processor circuit that generates a bitmap indicating whether each of a plurality of interference sources are present and then transmits the bitmap to the user equipment.

In other embodiments, the base station may signal a first set of parameters to UEs on a wideband basis, and signal a second set of parameters to UEs on a narrow-band basis. For example, the first set of parameters may be applicable to all PRBs in assigned frequency resources, and the second set of parameters applicable to each PRB pair or each PRG in an assigned frequency resource of the UE.

The interference parameters may identify, for example, one or more of:
  Demodulation Reference Signal (DMRS) antenna ports;
  DMRS antenna port scrambling sequence initialization identification number (nSCID);
  a power level of an interference signal;
  a transmission rank of an interference signal;
  a modulation order of an interference signal;
  a code rate of an interference signal;
  a Radio Network Temporary Identifier (RNTI) of an interference signal;
  a cell ID of a neighboring interfering cell; and
  a System-Frame-Number (SFN) of an interference signal.

The UE receives the one or more parameters comprising information about signals expected to cause intra-cell or inter-cell interference. The UE processes received signals using the one or more parameters to suppress the intra-cell or inter-cell interference.

BRIEF DESCRIPTION OF THE DRAWINGS

These and other aspects of this invention are illustrated in the drawings, in which.

DETAILED DESCRIPTION

The invention(s) will now be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
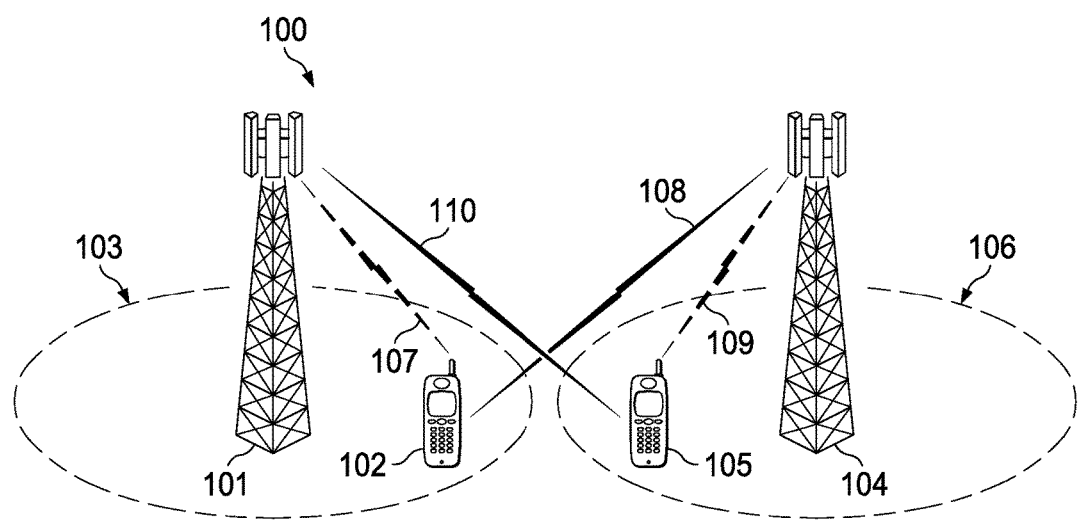
FIG. 1 illustrates inter-cell interference in a cellular network.

FIG. 1 illustrates inter-cell interference in a cellular network. When inter-cell interference occurs, the interference arises from neighboring base stations that are transmitting to other users in neighboring cells. A typical cellular network has no coordination between different base stations and, therefore, the inter-cell interference appears to a mobile user as random radio signals.

System 100 is a cellular network, such as a 3GPP Long Term Evolution (LTE) system. Base station 101, such as a LTE eNodeB, serves user equipment (UE) 102 and other devices (not shown) in cell 103. Base station 104 serves UE 105 and other devices (not shown) in cell 106. UE 102 receives downlink communications 107 from base station 101, and UE 105 receives downlink communications 108 from base station 104, Unfortunately, these downlink transmissions also reach into neighboring cells. As a result, UE 102 receives both its intended downlink communications 107 from base station 101 and unwanted communications 108 from neighboring base station 104. Similarly, UE 105 receives both its intended downlink communications 109 from base station 104 and unwanted communications 110 from neighboring base station 101. These unwanted communication signals cause inter-cell interference at UEs 102, 105.

Figure 2:
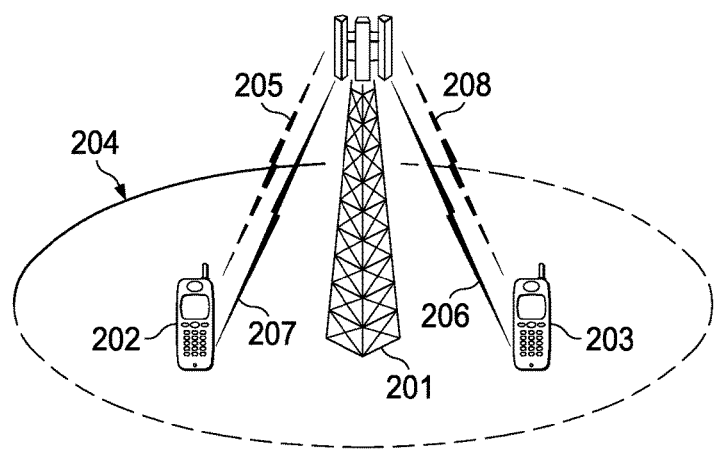
FIG. 2 illustrates intra-cell interference in a cellular network.

FIG. 2 illustrates intra-cell interference in a cellular network. Intra-cell interference arises when one serving base station transmits to one or multiple co-scheduled users in the same cell. For example, multi-user multiple-input and multiple-output (MU-MIMO) in LTE follows a transparent design principle through Release 8-11, wherein a UE has no information about the presence, or the property of, any co-scheduled users in the same cell. In other words, a UE is unaware whether it is scheduled in single-user MIMO (SU-MIMO) mode or paired with another user in MU-MIMO mode.

Base station 201 serves both UE 202 and UE 203 in cell 204, Downlink transmissions 205 are intended for UE 202, and downlink transmissions 208 are intended for UE 203, However., UE 202 may also receive transmissions 207, which are intended for UE 203 or some other device in cell 204. Transmissions 207 cause intra-cell interference for UE 202. Similarly, transmissions 206, which are intended for UE 202 or some other device in cell 204, cause intra-cell interference for UE 203.

In recent years, advanced MIMO receivers have been gradually implemented by mobile handset manufacturers and chipset vendors to achieve better MIMO decoding performance. In addition to decoding its own signal, it is possible for an advanced MIMO receiver to blindly suppress/decode the intra/inter-cell interference through brute-force search, which may significantly improve the downlink signal-to-noise ratio (SNR) and data throughput. Although this is feasible and requires no standardization support, it is still very challenging in terms of UE complexity, power consumption, and chipset size despite recently improvements in UE receiver design. Alternatively, it is speculated that if the network may signal the interference property to the UE, the UE may exploit such information to achieve better interference cancellation and suppression, with a reasonably low UE complexity. Such additional downlink signaling of interference property may result in new downlink control signaling in cellular networks.

These issues are discussed herein along with proposals for:
  possible information concerning downlink interference to be signaled by the network;
  methods of signaling such information by the network; and
  a mechanism for mobile receivers to receive and exploit such signaled interference information.

Figure 3:
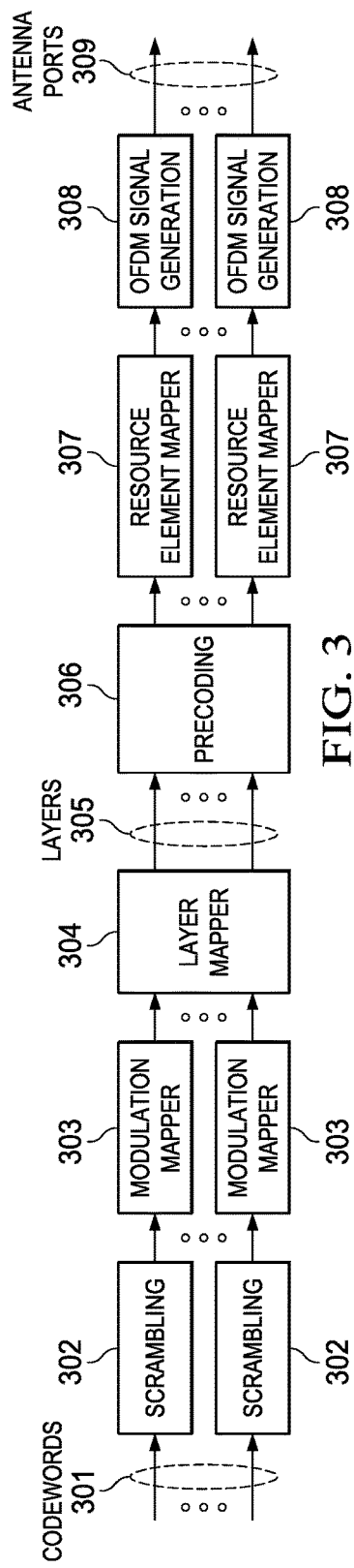
FIG. 3 is a block diagram illustrating an overview of physical channel processing of LTE downlink at the base station.

FIG. 3 is a block diagram illustrating an overview of physical channel processing of LTE downlink at the base station. Codewords 301 undergo scrambling 302 and modulation mapping 303. A layer mapper 304 creates layers 305 that are precoded 306 and then mapped to resource elements 307. OFDM signals are then generated 308 and transmitted via assigned antenna ports 309.

In a conventional wireless system, a UE decodes only its own signals, such as signals intended for the UE on the Physical Downlink Shared Channel (PDSCH). MIMO receivers may be categorized as linear or non-linear. For linear MIMO receivers, an equalization matrix (R×Nr) is applied to the received signal vector (Nr×1) to remove the inter-layer interference, wherein R is the number of data layers and Nr is the number of receive antennas. Per-layer demodulation and decoding is then performed (e.g., descrambling, de-interleaving, de-modulation, and decoding). Popular linear MIMO receivers include the zero-forcing receiver, linear MMSE receiver, and linear MMSE receiver with interference-rejection combining For non-linear MIMO receivers, decoding and demodulation of multiple layers are not independent but instead involves each other.

For a maximum-likelihood (ML) receiver, the decoder exhaustively searches all possible Quadrature Amplitude Modulation (QAM) constellation combinations of R layers for the best Nr×1 QAM symbol vector. ML decoder is optimal in terms of symbol error rate, but has a complexity that grows exponentially with R.

A successive interference cancellation receiver is also possible where the receiver decodes a first layer, reconstructs the first layer, subtracts the resultant interference from the residual signal, and then proceeds to decode a second layer. Both soft and hard interference cancellations are possible. With soft interference cancellation, in one scenario, inter-layer interference is constructed by estimating soft QAM constellations of the first layer without channel decoding. Alternatively it is also possible to decode the transport block and use the soft information and parity bits to reconstruct the interference. With hard interference cancellation, the first layer is channel decoded to generate the original transport block (TB), where information bit of the 1st layer is then re-encoded, re-modulated, re-scrambled to generate inter-layer interference which is subtracted from the residual signals.

For advanced interference cancellation/suppression receiver, similar algorithms as for SU-MIMO can be applied, except that the target UE needs to decode its own signal (i. e., source signal) as well as signals meant for other users (i.e., interference signals). As such, information regarding the presence and/or the property of the co-scheduled user is required to facilitate the UE receiver operation, which shall be signaled by the network. The following sections discuss information that may be signaled by the network for interference cancellation and/or suppression.

In one embodiment, the network may send one or more parameters related to an interference signal, such as a subset of the parameters discussed below. A UE may exploit the information represented by these parameters for intra-cell and/or inter-cell interference cancellation and/or suppression.

Demodulation reference signal (DMRS) antenna port(s). The network may identify DMRS antenna port(s) on which the UE may assume that interference signal is transmitted. For example, when a target UE receives PDSCH on antenna port 7, the network may signal to the UE that an interference signal is being transmitted on antenna port 8 to another UE. The UE may process the received signals accordingly to minimize interference.

DMRS antenna port scrambling sequence initialization identification number ($n_{SCID}$). For each DMRS antenna port of an interference signal, the $n_{SCID}$ is signaled to the target UE. The $n_{SCID}$ is used by the target UE to generate the scrambling sequence of the DMRS port of the interference signal.

Power level of the interference signal. The network may signal the power level of the interference signal to a UE. The signaled power level may be the power of DMRS antenna port(s) of the interference signal and/or the power of PDSCH of the interference signal. The interference signal power level may be signaled either in the form of absolute power (e.g., dBm), or as a relative power ratio with respect to a reference power. For example, if PDSCH of the target UE is used as the default reference power, the network may signal to the target UE the ratio of PDSCH power of the interference signal to the PDSCH power of the target UE. The target UE may use such information to derive proper receiver weighting for channel estimation, PDSCH decoding, and interference cancellation and suppression.

Transmission rank of the interference signal. The network may signal the transmission rank (e.g., the number of PDSCH layers) of the interference signal. The number of PDSCH layers is equivalent to the number of DMRS antenna ports in DMRS-based transmission. One reason for the network to provide this signaling is due to the fact that the DMRS pattern, overhead, PDSCH mapping pattern, and PDSCH power is a function of the transmission rank.

For example, for rank-1/2 PDSCH transmission, the DMRS overhead is 12 Resource Elements (RE)/Physical Resource Block (PRB), and for rank-3/4 PDSCH transmission the DMRS overhead is 24 RE/PRB. Since PDSCH is rate-matched around DMRS, the PDSCH mapping pattern will also be different for rank-1/2 and rank-3/4.

For rank-1/2, the power of PDSCH on each antenna port is equivalent to the power of the corresponding DMRS antenna port. For rank-3/4, the power of PDSCH on each antenna port is 3dB lower than (e.g., 50% of) the power of the corresponding DMRS antenna port.

As such, by signaling the rank of the interference PDSCH signal, the network enables the target UE to correctly interpret the transmission properties of the DMRS as well as the PDSCH of the interference signal. Alternatively, instead of signaling the channel rank, the network may use 1-bit to signal the DMRS overhead (12 RE/PRB or 24 RE/PRB) or the PDSCH mapping pattern.

Modulation order. The network may signal the modulation order (e.g., Quadrature Phase Shift Keying (QPSK), 16 QAM, 64 QAM, etc.) of the interference signal. This information may be used by UE employing soft interference cancellation, based on which the UE may decode symbol-level QAM of the interference signal without performing channel decoding.

Code rate of the interference signal. The code rate of the interference signal may be used by a UE employing hard interference cancellation, based on which the UE may decode the transport block of the interference signal through channel decoding. The LTE system currently does not support explicit signaling of the code rate. Instead, the network may signal an index to the transport block size or the Modulation/Coding Scheme (MCS). Combined with the frequency assignment size, the UE may interpret the code rate. Similarly for Network Assisted Interference Cancellation and Suppression (NAICS), the network may signal an index to the transport block size or MCS of the interference signal to the UE. The UE may, for example, assume that the interference signal and the source PDSCH signal have the same frequency allocation (e.g., interference and target PDSCH are allocated in the same set of PRBs), to obtain the Transport Block Size (TBS) of the interference signal.

$n_{RNTI}$. The network may provide $n_{RNTI}$, which corresponds to the Radio Network Temporary Identifier (RNTI) of the associated interference signal. $n_{RNTI}$ is the UE-ID of the interfering UE to which the interference signal is targeted. $n_{RNTI}$ of the interference signal is required to reproduce the scrambling sequence for the interference PDSCH signal and is also needed if the target UE wishes to decode the interference signal transport block before performing hard interference cancellation. $n_{RNTI}$ may be signaled, for example, in the form of a "virtual UE-ID".

Cell ID of the neighboring interfering cell. The network may signal the cell ID of an interfering cell if the interference arises from a neighboring base station's transmission (i.e., inter-cell interference). This information is required reproduce the scrambling sequence of the interference PDSCH signal. The cell ID of the interference cell may be explicitly signaled or signaled in the formed of a "virtual cell ID," which the UE uses for generating the scrambling sequence of the interference DMRS signal.

System-frame-number (SFN). If the SFN of the source signal and the interference signals are not aligned, the network may signal the SFN value of the interference signal to the target UE. The SFN value of the interference cell is required to generate the scrambling sequence of the interference signal.

A target UE may receive multiple interference signals. For example, a UE may receive a strong inter-cell interference signal from one neighboring cell, as well as an intra-cell interference signal arising from the same serving cell that is transmitting to a co-scheduled user with MU-MIMO. As another example, single-cell MU-MIMO may co-schedule four users in the same subframe in the same cell, in which case three intra-cell interference signals are present at the UE. Therefore, the network may signal the number of interference signals that a UE shall expect.

Alternatively, the network may signal a bit sequence, wherein each bit indicates the presence of a possible interference source (e.g., "0" indicating no interference is present and "1" indicating interference is present). The length of the bitmap (whether fixed or Radio Resource Control (RRC)-signaled) may depend on the number of interference signals that a UE will expect in a typical cellular deployment, also taking into account the overhead of network signaling. If the length of the bitmap is RRC-signaled, it implies that the network will indicate to the UE the number of interference signals that the UE should expect. For instance, in typical homogeneous deployment scenarios with only macro base stations, there may be only a few dominant interference signals, which calls for a small length for the bitmap. For a dense urban deployment scenario with many low-power small cell base stations, a UE may receive a large number of interference signals, which calls for a larger bitmap length. The interference parameters defined above or a subset thereof may be independently signaled for each possible interference signal.

In one embodiment, the afore-mentioned interference parameters may be signaled on a wideband basis wherein the UE may assume that the signaled parameter(s) applies to all PRBs in its assigned frequency resources. Alternatively, these parameters may be signaled on a narrow-band basis, such as for each (PRB) pair or each Precoding Resource Block Group (PRG) in the assigned frequency resource of the target UE. It is not precluded that some parameters are signaled on wideband basis, while other parameters are signaled on narrow-band basis. For instance, the cell ID and SFN of the interference signal may be signaled on a wideband basis, while the $n_{RNTI}$, DMRS port, $n_{SCID}$ of the interference is signaled on a narrow-band basis.

The interference parameters may be semi-statically configured by RRC signaling or provided to the UE via dynamic signaling (e.g., in downlink (DL) grant). For example, the cell ID and SFN of the interference signal may be configured by RRC-signaling and remain constant for a relative long time, since the neighboring cell generating inter-cell interference may not change frequently. On the other hand, $n_{RNTI}$, DMRS port, DMRS scrambling of the interference signal may change subframe-to-subframe and can be signaled dynamically.

It is further noted that PDSCH rate-matching is UE-specific and dependent on the RRC-configured UE-specific signals (e.g., CSI-RS, zero-power CSI-RS, etc.). In one embodiment, the UE may assume that the interference signal is rate-matched in the same manner with the source signaled. In another embodiment, the UE may be signaled with the actual PDSCH mapping/rate-matching pattern of the interference signal. However this may incur significant signaling overhead and is not preferred.

Figure 4:
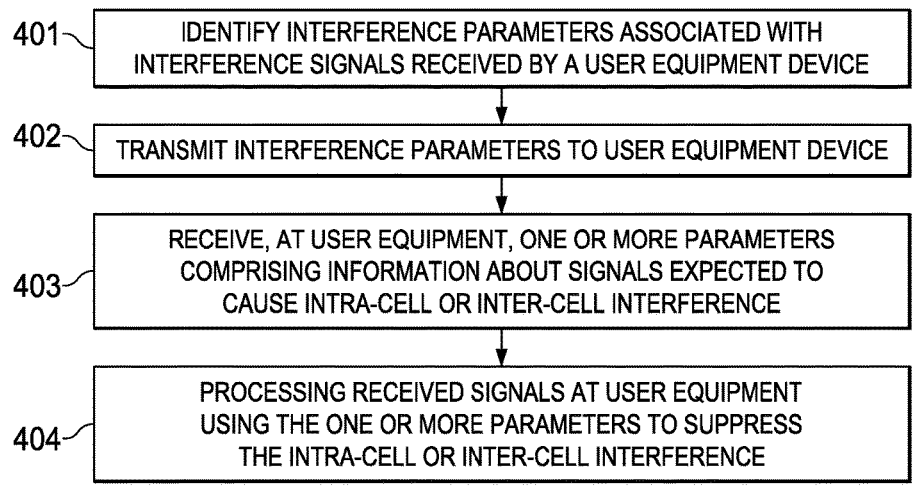
FIG. 4 is a flowchart illustrating a process for notifying user equipment of possible intra-cell and inter-cell interference signals according to one embodiment.

FIG. 4 is a flowchart illustrating a process for notifying UEs of possible intra-cell and inter-cell interference signals according to one embodiment. A cellular communication network is aware of which base stations are communicating with which UEs, and can determine that communications between one base station-UE pair may interfere with another UE that is in the same cell or a different cell. The network may notify a base station of communications in a neighboring cell that may cause interference. Alternatively, the base station may determine that communications to UEs within the base station's own cell may cause interference.

In step 401, the base station identifies interference parameters associated with interference signals that may be received by a UE. The interference signals may be generated by the base station itself, such as communications with other UEs, or by a neighboring base station. In step 402, the base station transmits the interference parameters to the UE. The one or more parameters identify a number of interference signals that may affect the user equipment. The interference parameters may be semi-statically configured, such as by RRC signaling or they may be dynamically configured by the network or base station.

The base station may include a processor circuit that generates a bitmap indicating whether each of a plurality of interference sources are present and then transmits the bitmap to the user equipment.

In other embodiments, the base station may signal a first set of parameters to UEs on a wideband basis, and signal a second set of parameters to UEs on a narrow-band basis. For example, the first set of parameters may be applicable to all PRBs in assigned frequency resources, and the second set of parameters applicable to each PRB pair or each PRG in an assigned frequency resource of the UE.

The interference parameters may identify, for example, one or more of:
  Demodulation Reference Signal (DMRS) antenna ports;
  DMRS antenna port scrambling sequence initialization identification number (nSCID);
  a power level of an interference signal;
  a transmission rank of an interference signal;
  a modulation order of an interference signal;
  a code rate of an interference signal;
  a Radio Network Temporary Identifier (RNTI) of an interference signal;
  a cell ID of a neighboring interfering cell; and
  a System-Frame-Number (SFN) of an interference signal.

In step 403, the UE receives the one or more parameters comprising information about signals expected to cause intra-cell or inter-cell interference. In step 404, the UE processes received signals using the one or more parameters to suppress the intra-cell or inter-cell interference.

Figure 5:
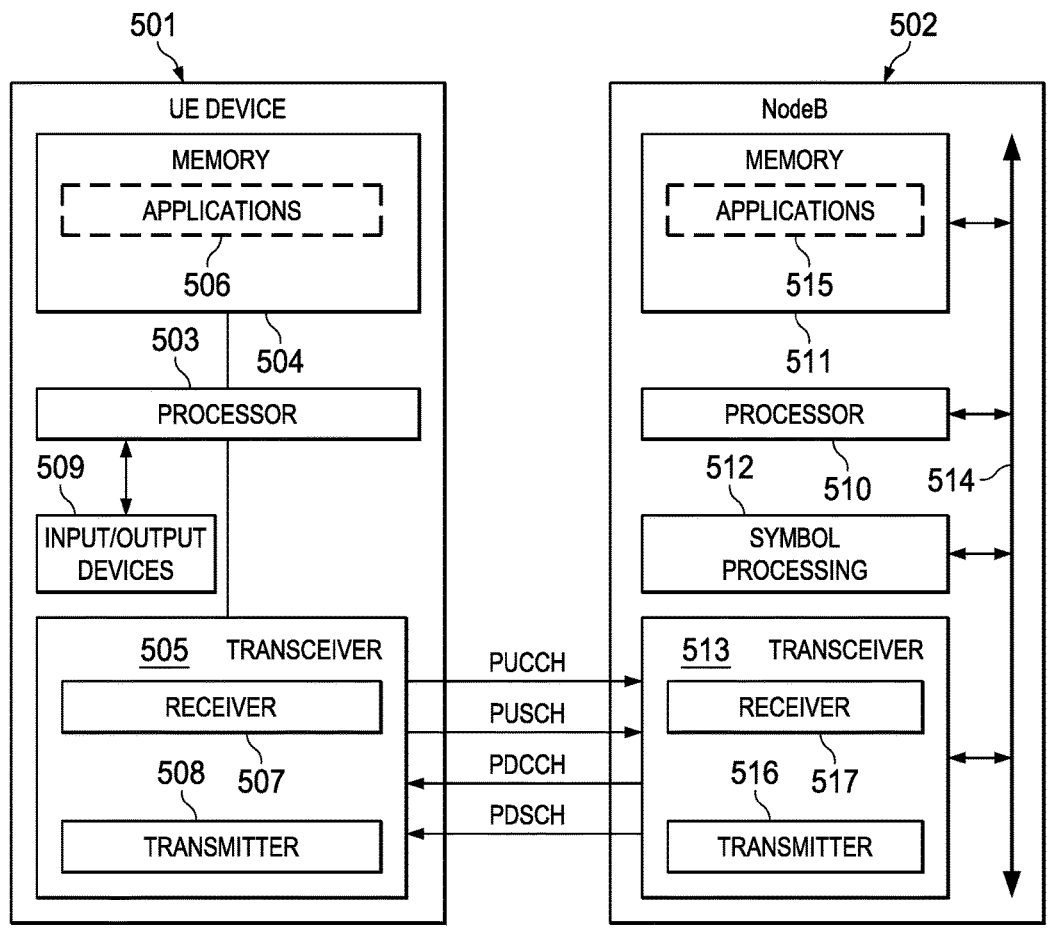
FIG. 5 is a block diagram illustrating internal details of a mobile user equipment and a base station operating in a network system such as illustrated in FIGS. 1 and 2.

FIG. 5 is a block diagram illustrating internal details of a mobile UE 501 and a bases station 503, such as an eNB, operating in a network system such as illustrated in FIGS. 1 and 2. Mobile UE 501 may represent any of a variety of devices such as a server, a desktop computer, a laptop computer, a cellular phone, a Personal Digital Assistant (PDA), a smart phone or other electronic devices. In some embodiments, the electronic mobile UE 501 communicates with eNB 502 based on a LTE or Evolved Universal Terrestrial Radio Access (E-UTRA) protocol. Alternatively, another communication protocol now known or later developed can be used.

Mobile UE 501 comprises a processor 503 coupled to a memory 504 and a transceiver 505. The memory 504 stores (software) applications 506 for execution by the processor 503. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 501 to transmit UL signals to eNB (base station) 502 periodically or continuously via the transceiver 505.

Transceiver 505 includes uplink logic which may be implemented by execution of instructions that control the operation of the transceiver. Some of these instructions may be stored in memory 504 and executed when needed by processor 503. As would be understood by one of skill in the art, the components of the uplink logic may involve the physical (PHY) layer and/or the Media Access Control (MAC) layer of the transceiver 505. Transceiver 505 includes one or more receivers 507 and one or more transmitters 508.

Processor 503 may send or receive data to various input/output devices 509. A subscriber identity module (SIM) card stores and retrieves information used for making calls via the cellular system. A Bluetooth baseband unit may be provided for wireless connection to a microphone and headset for sending and receiving voice data. Processor 503 may send information to a display unit for interaction with a user of mobile UE 501 during a call process. The display may also display pictures received from the network, from a local camera, or from other sources such as a Universal Serial Bus (USB) connector. Processor 503 may also send a video stream to the display that is received from various sources such as the cellular network via RF transceiver 505 or the camera.

During transmission and reception of voice data or other application data, transmitter 507 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 504 by processor 503. In other embodiments, the message size determination may be embodied by a separate processor/memory unit, by a hardwired state machine, or by other types of control logic, for example.

In one embodiment, UE 501 receives interference parameters from base station 502. Processor 503 uses the interference parameters to identify and suppress interference signals received at receiver 507.

eNB 502 comprises a processor 510 coupled to a memory 511, symbol processing circuitry 512, and a transceiver 513 via backplane bus 514. The memory stores applications 515 for execution by processor 510. The applications could comprise any known or future application useful for managing wireless communications. At least some of the applications 515 may direct eNB 502 to manage transmissions to or from mobile UE 501.

Transceiver 513 comprises an uplink resource manager, which enables eNB 502 to selectively allocate uplink Physical Uplink Shared CHannel (PUSCH) resources to mobile UE 501. As would be understood by one of skill in the art, the components of the uplink resource manager may involve the physical (PHY) layer and/or the Media Access Control (MAC) layer of the transceiver 513. Transceiver 513 includes at least one receiver 515 for receiving transmissions from various UEs within range of eNB 502 and at least one transmitter 516 for transmitting data and control information to the various UEs within range of eNB 502.

The uplink resource manager executes instructions that control the operation of transceiver 513. Some of these instructions may be located in memory 511 and executed when needed on processor 510. The resource manager controls the transmission resources allocated to each UE 501 served by eNB 502 and broadcasts control information via the PDCCH. UE 501 may receive TTD UL/DL configuration instructions from eNB 502.

Symbol processing circuitry 512 performs demodulation using known techniques. Random access signals are demodulated in symbol processing circuitry 512. During transmission and reception of voice data or other application data, receiver 517 may receive a random access signal from a UE 501. The random access signal is encoded to request a message size that is preferred by UE 501. UE 501 determines the preferred message size by using a message threshold provided by eNB 502.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
   receiving, at a user equipment (UE), one or more parameters comprising information about signals expected to cause intra-cell or inter-cell interference at the UE;
   processing received signals at the UE using the one or more parameters to suppress the intra-cell or inter-cell interference;
   receiving, at the UE, a first set of parameters signaled on a wideband basis, the first set of parameters applicable to all physical resource blocks (PRBs) in assigned frequency resources; and
   receiving a second set of parameters signaled on a narrow-band basis, the second set of parameters applicable to each PRB pair or each Precoding Resource Block Group (PRG) in an assigned frequency resource of the UE.

2. A base station, comprising:
   a processor circuit configured to:
      identify interference parameters associated with interference signals received by a user equipment, wherein the interference signals are generated by the base station or by a neighboring base station;
      transmit the interference parameters to the user equipment;
      signal a first set of parameters to user equipment on a wideband basis, the first set of parameters applicable to all physical resource blocks (PRBs) in assigned frequency resources; and
      signal a second set of parameters to user equipment on a narrow-band basis, the second set of parameters applicable to each PRB pair or each Precoding Resource Block Group (PRG) in an assigned frequency resource of the UE.

3. A method, comprising:
   receiving, at a user equipment (UE), one or more parameters comprising information about signals expected to cause intra-cell or inter-cell interference at the UE, wherein the one or more parameters identify a virtual cell ID of a neighboring interfering cell used as an initialization seed for the pseudo-random sequence generator for Demodulation Reference Signal (DMRS) of the neighboring interfering cell and wherein the one or more parameters identify a System-Frame-Number (SFN) of an interference signal and wherein the SFN of a source signal and the interference signal are not aligned; and
   processing received signals at the UE using the one or more parameters to suppress the intra-cell or inter-cell interference.

4. A method, comprising:
   receiving, at a user equipment (UE), one or more parameters comprising information about signals expected to cause intra-cell or inter-cell interference at the UE, wherein the one or more parameters identify a virtual cell ID of a neighboring interfering cell used as an initialization seed for the pseudo-random sequence generator for Demodulation Reference Signal (DMRS) of the neighboring interfering cell, wherein the one or more parameters identify a System-Frame-Number (SFN) of an interference signal and wherein the SFN of a source signal and the interference signal are not aligned; and
   wherein the parameters are received using Radio Resource Control (RRC)-signaling.

5. A user equipment (UE) device, comprising:
   a processor circuit configured to:
      receive interference parameters with the interference parameters comprising information about signals expected to cause intra-cell or inter-cell interference, wherein one or more of the interference parameters identify a virtual cell ID of a neighboring interfering cell used as an initialization seed for the pseudo-random sequence generator for Demodulation Reference Signal (DMRS) of the neighboring interfering cell, wherein one or more of the interference parameters identify a System-Frame-Number (SFN) of an interference signal and wherein the SFN of a source signal and the interference signal are not aligned; and
      wherein the parameters are received using Radio Resource Control (RRC)-signaling.

* * * * *